United States Patent
Alcantara et al.

(10) Patent No.: US 10,810,255 B2
(45) Date of Patent: Oct. 20, 2020

(54) METHOD AND SYSTEM FOR INTERFACING WITH A USER TO FACILITATE AN IMAGE SEARCH FOR A PERSON-OF-INTEREST

(71) Applicant: Avigilon Corporation, Vancouver (CA)

(72) Inventors: Tulio Alcantara, Vancouver (CA); Moussa Doumbouya, Melrose, MA (US); Eric Sjue, Vancouver (CA); Hannah Valbonesi, Burnaby (CA); William Christopher Weston, Burnaby (CA)

(73) Assignee: Avigilon Corporation, Vancouver (CA)

( * ) Notice: Subject to any disclaimer, the term of this patent is extended or adjusted under 35 U.S.C. 154(b) by 363 days.

(21) Appl. No.: 15/705,076

(22) Filed: Sep. 14, 2017

(65) Prior Publication Data

US 2019/0080003 A1    Mar. 14, 2019

(51) Int. Cl.
| | |
|---|---|
| *G06F 16/78* | (2019.01) |
| *G06F 16/783* | (2019.01) |
| *G06K 9/00* | (2006.01) |
| *G06F 16/738* | (2019.01) |
| *G06F 16/583* | (2019.01) |
| *H04N 7/18* | (2006.01) |

(52) U.S. Cl.
CPC ........ *G06F 16/784* (2019.01); *G06F 16/5838* (2019.01); *G06F 16/738* (2019.01); *G06F 16/7867* (2019.01); *G06K 9/00369* (2013.01); *G06K 9/00771* (2013.01); *H04N 7/181* (2013.01)

(58) Field of Classification Search
CPC .................................................. G06F 17/2211
USPC ............................................... 707/7; 382/118
See application file for complete search history.

(56) References Cited

U.S. PATENT DOCUMENTS

| | | | |
|---|---|---|---|
| 9,412,009 B2 | 8/2016 | Myers et al. | |
| 2005/0275902 A1* | 12/2005 | Koyama | H04N 1/00132 358/401 |
| 2008/0089560 A1* | 4/2008 | Li | G06K 9/00261 382/118 |
| 2008/0294663 A1 | 11/2008 | Heinley et al. | |
| 2009/0164494 A1* | 6/2009 | Dodin | G06F 8/42 |

(Continued)

FOREIGN PATENT DOCUMENTS

EP    1260934    11/2002

OTHER PUBLICATIONS

"Avigilon Control Center Client User Guide"; Version: 4.10 Standard; © 2011; 151 pages.

(Continued)

*Primary Examiner* — Baoquoc N To
(74) *Attorney, Agent, or Firm* — Daniel Hammond

(57) ABSTRACT

Methods, systems, and techniques for interfacing with a user to facilitate an image search for a person-of-interest. A face thumbnail of the person-of-interest, a body thumbnail of the person-of-interest, and image search results of the person-of-interest are concurrently displayed on a display to help a user identify the person-of-interest who appears in one or more of a collection of video recordings. The user may provide feedback to the system regarding whether image search results show the person-of-interest, which feedback may be used to refine the image search results.

35 Claims, 10 Drawing Sheets

(56) References Cited

U.S. PATENT DOCUMENTS

| | | | | |
|---|---|---|---|---|
| 2009/0254336 | A1* | 10/2009 | Dumais | G06F 9/451 704/9 |
| 2009/0259987 | A1* | 10/2009 | Bergman | G06F 8/36 717/107 |
| 2011/0158558 | A1 | 6/2011 | Zhao et al. | |
| 2012/0027268 | A1* | 2/2012 | Kwan | G06F 16/5838 382/118 |
| 2013/0070052 | A1* | 3/2013 | Yamashita | H04N 13/194 348/43 |
| 2013/0073984 | A1 | 3/2013 | Lessin et al. | |
| 2014/0328512 | A1 | 11/2014 | Gurwitz et al. | |
| 2015/0319402 | A1* | 11/2015 | Abuelsaad | H04N 5/77 386/224 |
| 2015/0347823 | A1* | 12/2015 | Monnerat | G02B 27/017 382/118 |
| 2015/0378997 | A1* | 12/2015 | Becker | G06F 16/93 707/748 |
| 2015/0379092 | A1* | 12/2015 | Becker | G06F 16/93 707/769 |
| 2015/0379887 | A1* | 12/2015 | Becker | G06F 16/93 715/229 |
| 2016/0110046 | A1 | 4/2016 | Yao | |
| 2016/0142613 | A1* | 5/2016 | Brav | H04N 5/23206 348/211.3 |
| 2016/0150072 | A1* | 5/2016 | Rangarajan | H04W 52/0254 455/574 |
| 2017/0249067 | A1* | 8/2017 | Marzke | G06F 16/24575 |
| 2017/0352380 | A1 | 12/2017 | Doumbouya et al. | |
| 2018/0184264 | A1* | 6/2018 | Dulick | H04L 12/1435 |
| 2018/0322253 | A1* | 11/2018 | Goyal | G06F 19/3418 |

OTHER PUBLICATIONS

Caldwell, Serenity; "How to find Faces and People in the Photos app for iPhone or iPad"; (http://web.archive.org/web/20170506043133/ https://www.imore.com/how-add-remove-change-or-hide-people-photos-app-ios-10); Oct. 3, 2016; 19 pages.

* cited by examiner

METHOD AND SYSTEM FOR INTERFACING WITH A USER TO FACILITATE AN IMAGE SEARCH FOR A PERSON-OF-INTEREST

TECHNICAL FIELD

The present disclosure is directed at methods, systems, and techniques for interfacing with a user to facilitate an image search for a person-of-interest.

BACKGROUND

In certain contexts, intelligent processing and playback of recorded video is an important function to have in a physical surveillance system. For example, a physical surveillance system may include many cameras, each of which records video. The total amount of video recorded by those cameras, much of which is typically recorded concurrently, makes relying upon manual location and tracking of a person-of-interest who appears in the recorded video inefficient. Intelligent processing and playback of video, and in particular automated search functionality, may accordingly be used to increase the efficiency with which a person-of-interest can be identified using a physical surveillance system.

SUMMARY

According to a first aspect, there is provided a method for interfacing with a user to facilitate an image search for a person-of-interest. The method comprises concurrently displaying, on a display, a face thumbnail of the person-of-interest, a body thumbnail of the person-of-interest, and image search results of the person-of-interest.

Each of the image search results may be positioned on the display according to a likelihood that the image search result comprises the person-of-interest, and the method may further comprise receiving match confirmation user input regarding whether at least one of the image search results depicts the person-of-interest; determining, using the match confirmation user input, whether positioning of the image search results is to be changed in response to the match confirmation user input; and when the positioning of the image search results is to be changed, updating the positioning of the image search results in response to the match confirmation user input.

The method may further comprise displaying a selected video recording concurrently with the face thumbnail, body thumbnail, and image search results.

The person-of-interest may be displayed in the selected video recording, and the method may further comprise displaying a boundary box over the person-of-interest in the selected video recording; receiving search commencement user input indicating that a search for the person-of-interest is to commence; and in response to the search commencement user input, using as the body thumbnail at least a portion of an image frame from the selected video recording contained within the boundary box.

The method may further comprise, in response to the search commencement user input, searching a collection of video recordings for the person-of-interest, wherein the collection of video recordings comprises the selected video recording; and using as part of the face thumbnail a face of the person-of-interest identified during the searching of the collection of video recordings.

The collection of video recordings may comprise video recordings generated concurrently using different video cameras.

The image search results may comprise a first image and a second image, the body thumbnail may comprise at least a portion of the first image, the face thumbnail may comprises at least a portion of the second image, and the first and second images may be different.

Searching the collection of video recordings for the person-of-interest may comprise performing a face search on the collection of video recordings to identify the person-of-interest; and performing a body search on the collection of video recordings to identify the person-of-interest, wherein the image search results comprise results from the face search and results from the body search.

The image search results may comprise a first image and a second image, the body thumbnail may comprise at least a portion of the first image, the face thumbnail may comprise at least a portion of the second image, and the method may further comprise displaying a first and a second indicator over the first and second images indicating that the first and second images are bases for the body and face thumbnails, respectively.

The method may further comprise receiving match confirmation user input regarding whether at least one of the image search results depicts the person-of-interest; and when the match confirmation user input indicates that any one of the selected image results depicts the person-of-interest, displaying a third indicator over the any one of the selected image results.

The method may further comprise determining an appearance likelihood plot for the person-of-interest, wherein the appearance likelihood plot depicts a likelihood that the person-of-interest appears in the collection of video recordings over a time span; and displaying, concurrently with the image search results, the appearance likelihood plot.

The time span may be divided into time intervals. Further, determining the appearance likelihood plot may comprise determining, for each of the time intervals, a likelihood that the person-of-interest appears in the collection of video recordings for the time interval; and displaying the appearance likelihood plot may comprise, for each of the time intervals, displaying a likelihood indicator representing the likelihood that the person-of-interest appears in the collection of video recordings for the time interval.

For each of the time intervals, the likelihood that the person-of-interest appears in the collection of video recordings for the time interval may be determined as a maximum likelihood that the person-of-interest appears in any one of the collection of video recordings for the time interval.

The appearance likelihood plot may comprise a bar graph comprising a single bar for each of the time intervals.

The method may further comprise displaying an appearance likelihood plot resizable selection window over the appearance likelihood plot, wherein the resizable selection window overlays at least a portion of the time span and the image search results are selected only from the collection of video recordings corresponding to the portion of the time span.

The method may further comprise concurrently displaying a timeline with the appearance likelihood plot, wherein the timeline covers a time span comprising at least part of a duration of the collection of video recordings; displaying a timeline resizable selection window over the timeline; receiving window resizing user input indicating that the user is resizing one of the selection windows; and in response to the window resizing user input, adjusting the other of the selection windows such that both of the selection windows cover identical time spans.

The image search results may comprise a first image and a second image, the body thumbnail may comprise at least a portion of the first image, the face thumbnail may comprise at least a portion of the second image, and the method may further comprise displaying a first and a second indicator over the first and second images indicating that the first and second images are bases for the body and face thumbnails, respectively; and displaying the first and second indicators on the appearance likelihood plot at positions corresponding to times the first and second images appear in the collection of video recordings.

The method may further comprise concurrently displaying with the appearance likelihood plot a timeline, wherein the timeline covers a time span comprising at least part of a duration of the collection of video recordings; and the first and second indicators on the timeline at positions corresponding to times the first and second images appear in the collection of video recordings.

According to another aspect, there is provided a method for interfacing with a user to facilitate an image search for a person-of-interest. The method comprises concurrently displaying, on a display, image search results of the person-of-interest selected from a collection of video recordings and an appearance likelihood plot for the person-of-interest, the appearance likelihood plot depicting a likelihood that the person-of-interest appears in the collection of video recordings over a time span.

The method may further comprise concurrently displaying with the image search results and the appearance likelihood plot at least one of a face thumbnail and a body thumbnail of the person-of-interest.

The time span may be divided into time intervals, and displaying the appearance likelihood plot may comprise, for each of the time intervals, displaying a likelihood indicator representing the likelihood that the person-of-interest appears in the collection of video recordings for the time interval.

For each of the time intervals, the likelihood that the person-of-interest appears in the collection of video recordings for the time interval may be determined as a maximum likelihood that the person-of-interest appears in any one of the collection of video recordings for the time interval.

The appearance likelihood plot may comprise a bar graph comprising a single bar for each of the time intervals.

The method may further comprise displaying a resizable selection window over the appearance likelihood plot, wherein the resizable selection window overlays at least a portion of the time span and the image search results are selected only from the collection of video recordings corresponding to the portion of the time span.

The method may further comprise concurrently displaying a timeline with the appearance likelihood plot, wherein the timeline covers a time span comprising at least part of a duration of the collection of video recordings; displaying a timeline resizable selection window over the timeline; receiving window resizing user input indicating that the user is resizing one of the selection windows; and in response to the window resizing user input, adjusting the other of the selection windows such that both of the selection windows cover identical time spans.

The image search results may comprise a first image and a second image, the body thumbnail may comprise at least a portion of the first image, and the face thumbnail may comprise at least a portion of the second image. The method may further comprise displaying a first and a second indicator over the first and second images indicating that the first and second images are bases for the body and face thumbnails, respectively; and displaying the first and second indicators on the appearance likelihood plot at positions corresponding to times the first and second images appear in the collection of video recordings.

The method may further comprise concurrently displaying with the appearance likelihood plot a timeline, wherein the timeline covers a time span comprising at least part of a duration of the collection of video recordings; and the first and second indicators on the timeline at positions corresponding to times the first and second images appear in the collection of video recordings.

According to another aspect, there is provided a method for interfacing with a user to facilitate an image search of a collection of video recordings for a person-of-interest. The method comprises concurrently displaying on a display image search results for the person-of-interest, wherein the image search results are displayed as an array of n columns by m rows, each of the columns corresponds to a different time interval, and for each of the columns the search results for any one of the rows has a likelihood of displaying the person-of-interest no lower than any lower one of the rows; a face thumbnail of the person-of-interest; and a body thumbnail of the person-of-interest; receiving match confirmation user input regarding whether at least one of the image search results depicts the person-of-interest. The method further comprises determining, using the match confirmation user input, whether positioning of the image search results is to be changed in response to the match confirmation user input indicating that any one or more of the image search results comprises the person-of-interest; and when the positioning of the image search results is to be changed, updating the positioning of the image search results by adjusting the rows in which the image search results are displayed.

According to another aspect, there is provided a system for interfacing with a user to facilitate an image search for a person-of-interest. The system comprising a display; an input device; a processor communicatively coupled to the display and the input device; and a memory communicatively coupled to the processor and having stored thereon computer program code that is executable by the processor, wherein the computer program code, when executed by the processor, causes the processor to perform the method of any of the foregoing aspects or suitable combinations thereof.

According to another aspect, there is provided a non-transitory computer readable medium having stored thereon computer program code that is executable by a processor and that, when executed by the processor, causes the processor to perform the method of any of the foregoing aspects or suitable combinations thereof.

BRIEF DESCRIPTION OF THE DRAWINGS

Reference will now be made, by way of example, to the accompanying drawings.

Similar or the same reference numerals may have been used in different figures to denote similar example features illustrated in the drawings.

DETAILED DESCRIPTION OF EXAMPLE EMBODIMENTS

Figure 1:
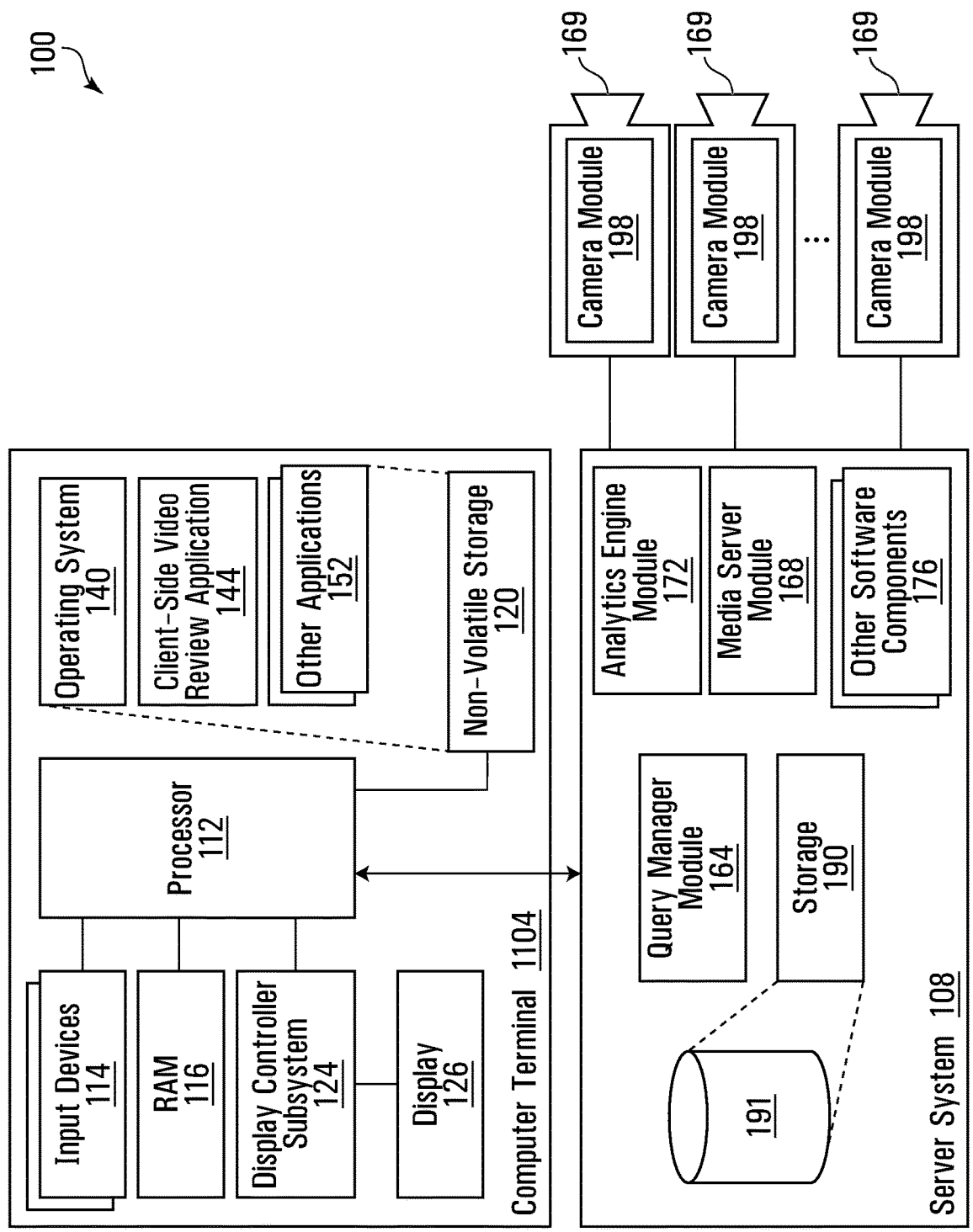
FIG. 1 shows a block diagram of an example physical surveillance system within which methods in accordance with example embodiments can be carried out.

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system." Furthermore, the various example embodiments may take the form of a computer program product on a computer-usable storage medium having computer-usable program code embodied in the medium.

Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to various embodiments. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

This disclosure describes various example embodiments. It is contemplated that any part of any example embodiment described herein may be implemented or combined with any part of any other example embodiment described herein.

Reference is now made to FIG. 1 which shows a block diagram of an example surveillance system 100 within which methods in accordance with example embodiments can be carried out. Included within the illustrated surveillance system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems [not shown]. The display controller subsystem 124 interacts with display 126 and it renders graphics and/or text upon the display 126.

Still with reference to the computer terminal 104 of the surveillance system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
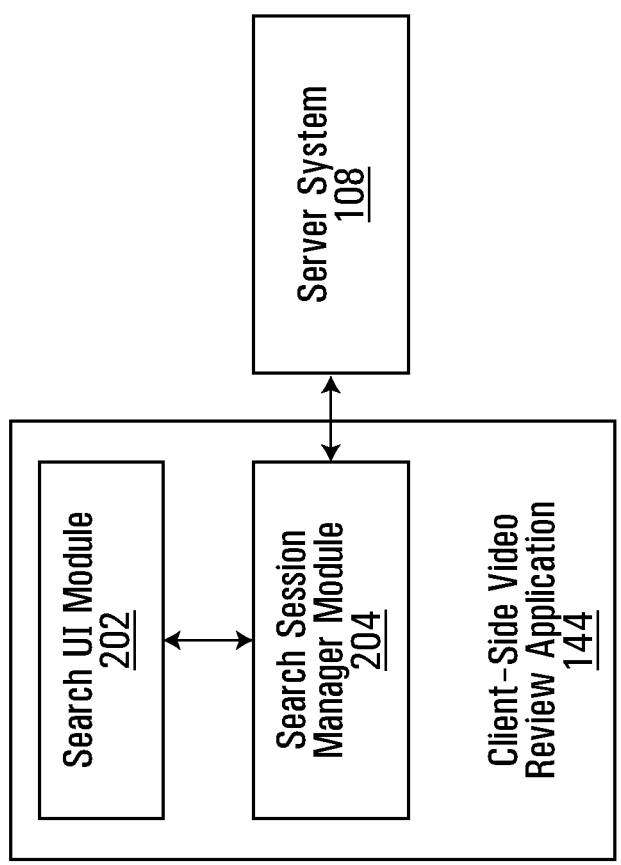
FIG. 2 shows a block diagram of a client-side video review application, in accordance with certain example embodiments, that can be provided within the example surveillance system of FIG. 1.

More details of the video review application 144 are shown in the block diagram of FIG. 2. The video review application 144 can be run on the computer terminal 104 and includes a search User Interface (UI) module 202 for cooperation with a search session manager module 204 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation the video recordings.

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs).

Besides the query manager module 164, the server system 108 includes several software components for carrying out other functions of the server system 108. For example, the server system 108 includes a media server module 168. The media server module 168 handles client requests related to storage and retrieval of video taken by video cameras 169 in the surveillance system 100. The server system 108 also includes an analytics engine module 172. The analytics engine module 172 can, in some examples, be any suitable one of known commercially available software that carry out mathematical calculations (and other operations) to attempt computerized matching of same individuals or objects as between different portions of video recordings (or as between any reference image and video compared to the reference image). For example, the analytics engine module 172 can, in one specific example, be a software component of the Avigilon Control Center™ server software sold by Avigilon Corporation. In another example, the analytics engine module 172 can be a software component of the Qognify Suspect Search™ product sold by Qognify UK Ltd. In some examples the analytics engine module 172 can use the descriptive characteristics of the person's or object's appearance. Examples of these characteristics include the person's or object's shape, size, textures and color.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The server system 108 also includes one or more data stores 190. In some examples, the data store 190 comprises one or more databases 191 which facilitate the organized storing of recorded video.

Regarding the video cameras 169, each of these includes a camera module 198. In some examples, the camera module 198 includes one or more specialized integrated circuit chips to facilitate processing and encoding of video before it is even received by the server system 108. For instance, the specialized integrated circuit chip may be a System-on-Chip (SoC) solution including both an encoder and a Central Processing Unit (CPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller then what was in the bounding box or may be larger then what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule may be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle or animal) based upon a single instance of the object. The input to the instantaneous object classification submodule may optionally be a sub-region of an image in which the visual object of interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a bicycler. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

In some examples, the camera module 198 is able to detect humans and extract images of humans with respective bounding boxes outlining the human objects for inclusion in metadata which along with the associated video may transmitted to the server system 108. At the system 108, the media server module 168 can process extracted images and generate signatures (e.g. feature vectors) to represent objects. In computer vision, a feature descriptor is generally known as an algorithm that takes an image and outputs feature descriptions or feature vectors. Feature descriptors encode information, i.e. an image, into a series of numbers to act as a numerical "fingerprint" that can be used to differentiate one feature from another. Ideally this information is invariant under image transformation so that the features may be found again in another image of the same object. Examples of feature descriptor algorithms are SIFT (Scale-invariant feature transform), HOG (histogram of oriented gradients), and SURF (Speeded Up Robust Features).

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

Similarity calculation can be just an extension of the above. Specifically, by calculating the Euclidean distance between two feature vectors of two images captured by one or more of the cameras 169, a computer implementable process can determine a similarity score to indicate how similar the two images may be.

In accordance with at least some examples, storage of feature vectors within the surveillance system 100 is contemplated. For instance, feature vectors may are indexed and stored in the database 191 with respective video. The feature vectors may also be associated with reference coordinates to where extracted images of respective objects are located in respective video. Storing may include storing video with, for example, time stamps, camera identifications, metadata with the feature vectors and reference coordinates, etc.

Referring now to FIGS. 3 to 8B, there are shown various user interface pages that the search UI module 202 displays to a user of the client-side video review application 144, according to one example embodiment. The embodiment depicted in FIGS. 2 to 8B permits the application's 144 user to commence a search for a person-of-interest and to have a face thumbnail and a body thumbnail of the person-of-interest displayed to assist the user in identifying the person-of-interest while reviewing image search results. As used herein, a "person-of-interest" is a person that the application's 144 user is attempting to locate using the surveillance system 100; a "body thumbnail" of a person displays at least a portion of a torso of that person; and a "face thumbnail" of a person displays at least a portion of a face of that person. In the depicted example embodiments, the body thumbnail of a person displays that person's head and torso, while the face thumbnail of that person shows, as a proportion of the total area of the thumbnail, more of that person's face than is shown in the body thumbnail. The server system 108 in the embodiment of FIGS. 2 to 8B is able to search any one or more of a collection of video recordings using any one or more of the cameras 169 based on one or both of the person-of-interest's body and face; the collection of video recordings may or may not be generated concurrently by the cameras 169. Permitting the body and face to be used during searching accordingly may help both the server system 108 and the user identify the person-of-interest, particularly when the person-of-interest's body changes appearance in different recordings or at different times (e.g., resulting from the person-of-interest changing clothes).

Figure 3:
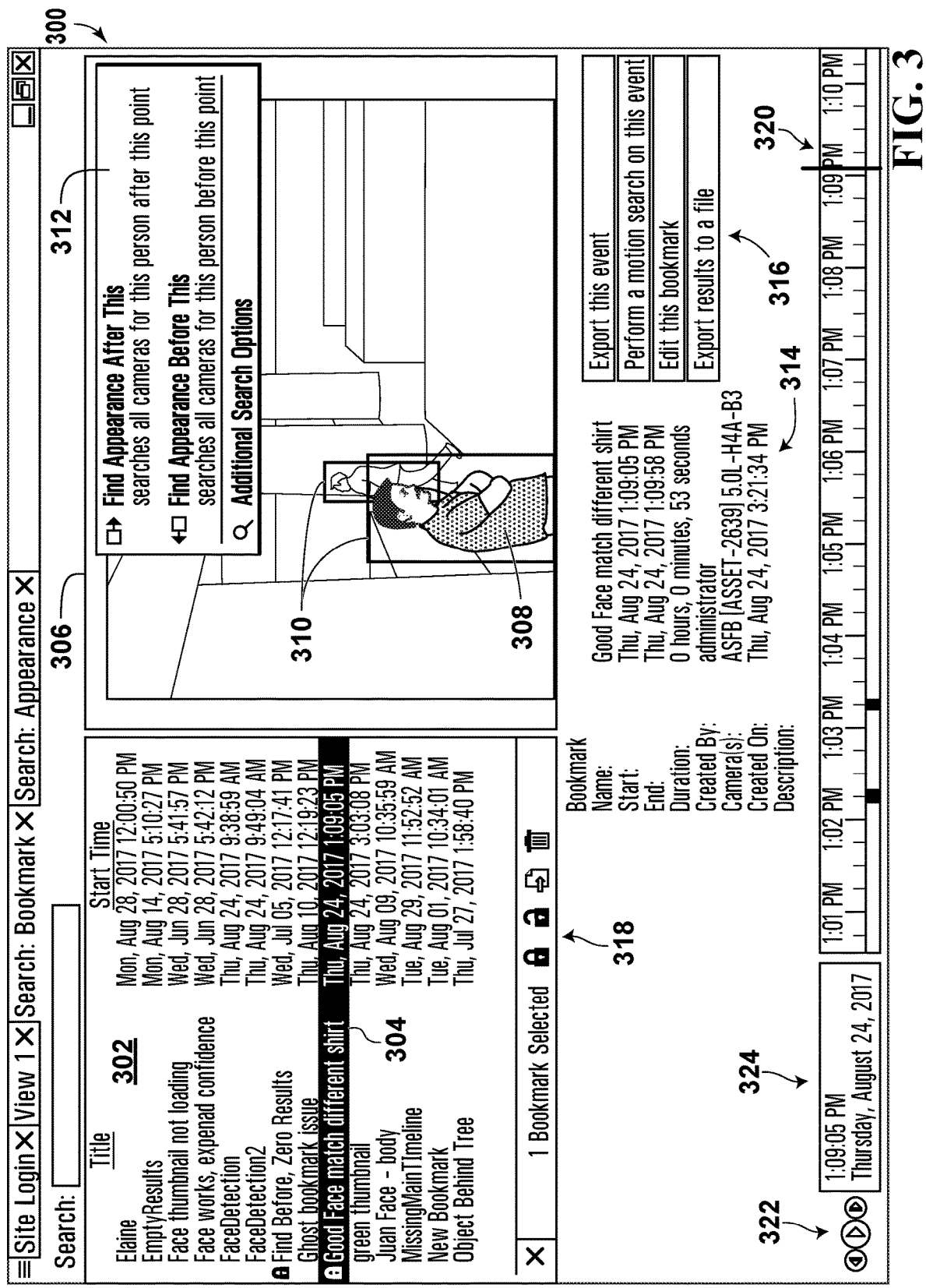
FIG. 3 shows a user interface page including an image frame of a video recording that permits a user to commence a search for a person-of-interest, according to an example embodiment implemented using the client-side video review application of FIG. 2.

Referring now to FIG. 3 in particular, there is shown a user interface page 300 including an image frame 306 of a selected video recording that permits a user of the application 144 to commence a search for a person-of-interest 308. The selected video recording shown in FIG. 3 is one of the collection of video recordings obtained using different cameras 169 to which the user has access via the application 144. The application 144 displays the page 300 on the terminal's 104 display 126. The user provides input to the application 144 via the input device 114, which in the example embodiment of FIG. 3 comprises a mouse or touch pad. In FIG. 3, displaying the image frame 306 comprises the application 144 displaying the image frame 306 as a still image, although in different embodiments displaying the image frame 306 may comprise playing the selected video recording or playing the selected video recording.

The image frame 306 of the selected video recording occupies the entirety of, and extends beyond, the top-right quadrant of the page 300. The frame 306 depicts a scene in which multiple persons are present. The server system 108 automatically identifies persons appearing in the scene that may be the subject of a search, and thus who are potential persons-of-interest 308 to the user, and highlights each of those persons by enclosing all or part of each in a boundary box 310. In FIG. 3, the user identifies the person located in the lowest boundary box 310 as the person-of-interest 308, and selects the boundary box 310 around that person to evoke a context menu 312 that may be used to commence a search. The context menu 312 presents the user with one option to search the collection of video recordings at all times after the image frame 306 for the person-of-interest 308, and another option to search the collection of video recordings at all times before the image frame 306. The user may select either of those options to have the server system 108 commence searching for the person-of-interest 308. The input the user provides to the server system 108 via the application 144 to commence a search for the person-of-interest is the "search commencement user input".

In FIG. 3, the user has bookmarked the image frame 306 according to which of the cameras 169 obtained it and its time index so as to permit the user to revisit that image frame 306 conveniently. Immediately below the image frame 306 is bookmark metadata 314 providing selected metadata for the selected video recording, such as its name and duration. To the right of the bookmark metadata 314 and below the image frame 306 are action buttons 316 that allow the user to perform certain actions on the selected video recording, such as to export the video recording and to perform a motion search on the recording.

Immediately to the left of the image frame 306 is a bookmark list 302 showing all of the user's bookmarks, with a selected bookmark 304 corresponding to the image frame 306. Immediately below the bookmark list 302 are bookmark options 318 permitting the user to perform actions such as to lock or unlock any one or more of the bookmarks to prevent them from being or to permit them to be changed, to export any one or more of the bookmarks, and to delete any one or more of the bookmarks.

Immediately below the bookmark options 318 and bordering a bottom-left edge of the page 300 are video control buttons 322 permitting the user to play, pause, fast forward, and rewind the selected video recording. Immediately to the right of the video control buttons 322 is a video time indicator 324, displaying the date and time corresponding to the image frame 306. Extending along a majority of the bottom edge of the page 300 is a timeline 320 permitting the user to scrub through the selected video recording and through the video collectively represented by the collection of video recordings. As discussed in further detail below in respect of FIGS. 8A and 8B, the timeline 320 is resizable in a manner that is coordinated with other features on the page 300 to facilitate searching.

Figure 4:
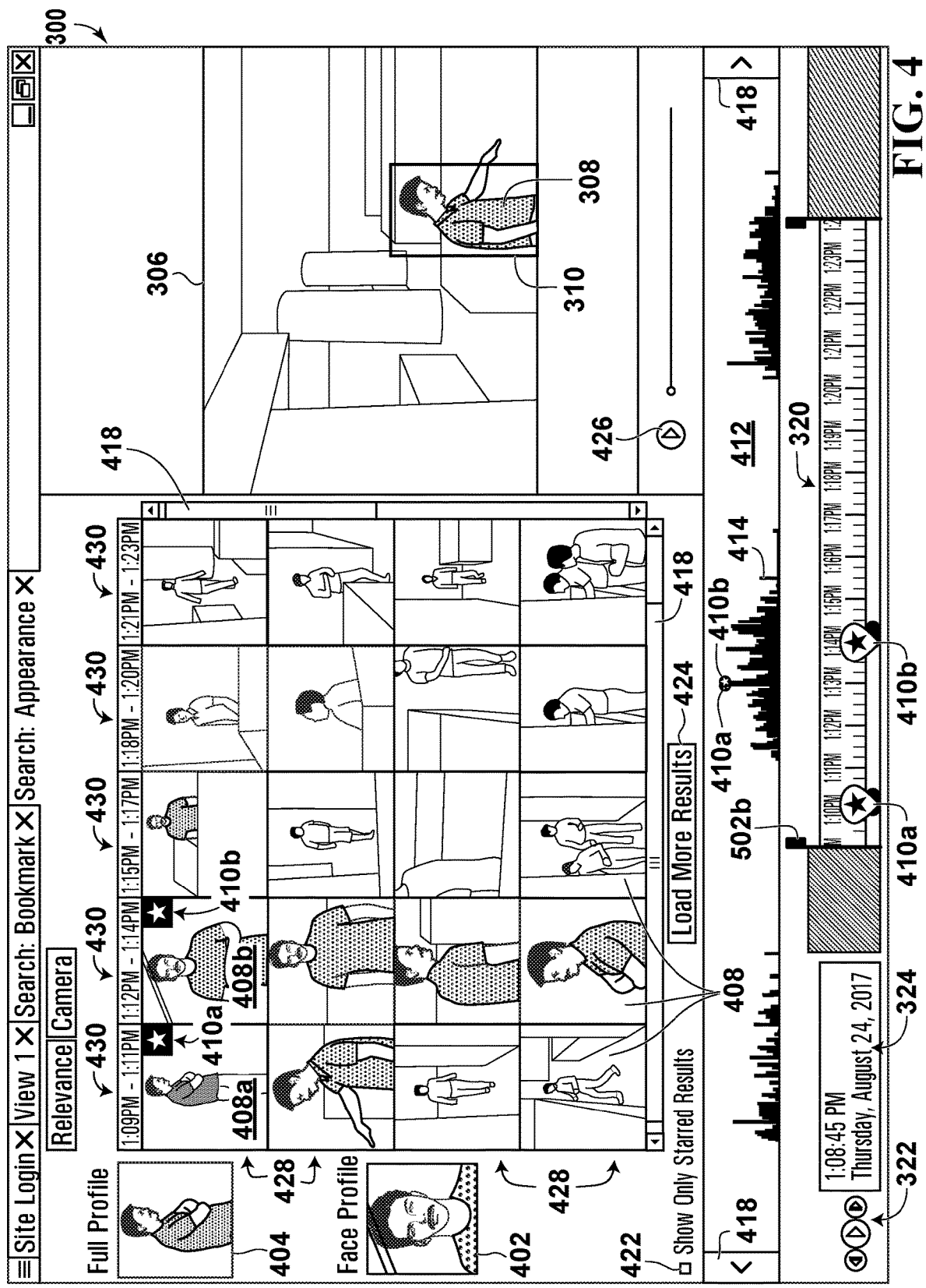
FIG. 4 shows a user interface page including image search results, a face thumbnail, and a body thumbnail of the person-of-interest, generated after a search for the person-of-interest has commenced and before a user has provided match confirmation user input, according to an example embodiment implemented using the client-side video review application of FIG. 2.

Referring now to FIG. 4, the user interface page 300 is shown after the server system 108 has completed a search for the person-of-interest 308. The page 300 concurrently displays the image frame 306 of the selected video recording the user used to commence the search bordering a right edge of the page 300; immediately to the left of the image frame 306, image search results 406 selected from the collection of video recordings by the server system 108 as potentially corresponding to the person-of-interest 108; and, immediately to the left of the image search results 406 and bordering a left edge of the page 300, a face thumbnail 402 and a body thumbnail 404 of the person-of-interest 308.

While video is being recorded, at least one of the cameras 169 and server system 108 in real-time identify when people, each of whom is a potential person-of-interest 308, are being recorded and, for those people, attempt to identify each of their faces. The server system 108 generates signatures based on the faces (when identified) and bodies of the people who are identified, as described above. The server system 108 stores information on whether faces were identified and the signatures as metadata together with the video recordings.

In response to the search commencement user input the user provides using the context menu 312 of FIG. 3, the server system 108 generates the image search results 406 by searching the collection of video recordings for the person-of-interest 308. The server system 108 performs a combined search includes a body search and a face search on the collection of video recordings using the metadata recorded for the person-of-interest's 308 body and face, respectively. More specifically, the server system 108 compares the body and face signatures of the person-of-interest 308 the user indicates he or she wishes to perform a search on to the body and face signatures, respectively, for the other people the system 108 has identified. The server system 108 returns the search results 406, which includes a combination of the results of the body and face searches, which the application 144 uses to generate the page 300. Any suitable method may be used to perform the body and face searches; for example, the server system 108 may use a convolutional neural network when performing the body search.

In one example embodiment, the face search is done by searching the collection of video recordings for faces. Once a face is identified, the coordinates of a boundary box that bounds the face (e.g., in terms of an (x,y) coordinate identifying one corner of the box and width of height of the box) and an estimation of the head pose (e.g., in terms of yaw, pitch, and roll) are generated. A feature vector may be generated that characterizes those faces using any one or more metrics. For example, for each face, any one or more of distance between the corners of eyes, distance between the centers of eyes, nose width, depth of eye sockets, shape of cheekbones, shape of jaw line, shape of chin, hair color, and the presence and color of facial hair may be used as metrics. Once the feature vectors are generated for the faces, the Euclidean distance between vectors for different faces may be determined and used to assess face similarity.

In at least one example embodiment, the cameras 169 generate the metadata and associated feature vectors in or nearly in real-time, and the server system 108 subsequently assesses face similarity using those feature vectors. However, in at least one alternative example embodiment the functionality performed by the cameras 169 and server system 108 may be different. For example, functionality may be divided between the server system 108 and cameras 169 in a manner different than as described above. Alternatively, one of the server system 108 and the cameras 169 may generate the feature vectors and assess face similarity.

In FIG. 3, the application 144 uses as the body thumbnail 404 at least a portion of the image frame 306 that is contained within the boundary box 310 highlighting the person-of-interest. The application 144 uses as the face thumbnail 402 at least a portion of one of the face search results that satisfy a minimum likelihood that that result correspond to the person-of-interest's 308 face; in one example embodiment, the face thumbnail 402 is drawn from the result of the face search that is most likely to correspond to the person-of-interest's 308 face. Additionally or alternatively, the result used as the basis for the face thumbnail 402 is one of the body search results that satisfies a minimum likelihood that the result correspond to the person-of-interest's 308 body. In another example embodiment, the face thumbnail 402 may be selected as at least a portion of the image frame 306 that is contained within the boundary box 310 highlighting the person-of-interest 308 in FIG. 3.

In FIG. 4, the image search results 406 comprise multiple images arranged in an array comprising n rows 428 and m columns 430, with n=1 corresponding to the array's topmost row 428 and m=1 corresponding to the array's leftmost column 430. The results 406 are positioned in a window along the right and bottom edges of which extend scroll bars 418 that permit the user to scroll through the array. In FIG. 4, the array comprises at least 4×5 images, as that is the portion of the array that is visible without any scrolling using the scroll bars 418.

Each of the columns 430 of the image search results 406 corresponds to a different time period of the collection of video recordings. In the example of FIG. 4, each of the columns 430 corresponds to a three minute duration, with the leftmost column 430 representing search results 406 from 1:09 p.m. to 1:11 p.m., inclusively, the rightmost column 430 representing search results 406 from 1:21 p.m. to 1:23 p.m., inclusively, and the middle three columns 430 representing search results 406 from 1:12 p.m. to 1:20 p.m., inclusively. Additionally, in FIG. 4 each of the image search results 406 is positioned on the display 126 according to a likelihood that the image search result 406 corresponds to the person-of-interest 308. In the embodiment of FIG. 4, the application 144 implements this functionality by making the height of the image search result 406 in the array proportional to the likelihood that image search result 406 corresponds to the person-of-interest 308. Accordingly, for each of the columns 430, the search result 406 located in the topmost row 428 (n=1) is the result 406 for the time period corresponding to that column 430 that is most likely to correspond to the person-of-interest 308, with match likelihood decreasing as n increases.

In the depicted embodiment, all of the search results 406 satisfy a minimum likelihood that they correspond to the person-of-interest 308; for example, in certain embodiments the application 144 only displays search results 406 that have at least a 25% likelihood ("match likelihood threshold") of corresponding to the person-of-interest 308. However, in certain other embodiments, the application 144 may display all search results 406 without taking into account a match likelihood threshold, or may use a non-zero match likelihood threshold that is other than 25%.

In FIG. 4, the body and face thumbnails 404,402 include at least a portion of a first image 408a and a second image 408b, respectively, which include part of the image search results 406. The first and second images 408a,b, and accordingly the body and face thumbnails 404,402, are different in FIG. 4; however, in different embodiments (not depicted), the thumbnails 404,402 may be based on the same image. Overlaid on the first and second images 408a,b are a first and a second indicator 410a,b, respectively, indicating that the first and second images are the bases for the body and face thumbnails 404,402. In FIG. 4 the first and second indicators 410a,b are identical stars, although in different embodiments (not depicted) the indicators 410a,b may be different.

Located immediately below the image frame 306 of the selected video recording are play/pause controls 426 that allow the user to play and pause the selected video recording. Located immediately below the horizontal scroll bar 418 beneath the image search results 406 is a load more results button 424, which permits the user to prompt the application 144 for additional tranches of search results 406. For example, in one embodiment, the application 144 may initially deliver at most a certain number of results 406 even if additional results 406 exceed the match likelihood threshold. In that example, the user may request another tranche of results 406 that exceed the match likelihood threshold by selecting the load more results button 424. In certain other embodiments, the application 144 may be configured to display additional results 406 in response to the user's selecting the button 424 even if those additional results 406 are below the match likelihood threshold.

Located below the thumbnails 402,404 is a filter toggle 422 that permits the user to restrict the image search results 406 to those that the user has confirmed corresponds to the person-of-interest 308 by having provided match confirmation user input to the application 144, as discussed further below.

Spanning the width of the page 300 and located below the thumbnails 402,404, search results 406, and image frame 306 is an appearance likelihood plot for the person-of-interest 308 in the form of a bar graph 412. The bar graph 412 depicts the likelihood that the person-of-interest 308 appears in the collection of video recordings over a given time span. In FIG. 4, the time span is divided into time periods 416 of one day, and the entire time span is approximately three days (from August 23-25, inclusive). Each of the time periods 416 is further divided into discrete time intervals, each of which is represented by one bar 414 of the bar graph 412. As discussed in further detail below, any one or more of the time span, time periods, and time intervals are adjustable in certain embodiments. The bar graph 412 is bookmarked at its ends by bar graph scroll controls 418, which allow the user to scroll forward and backward in time along the bar graph 412.

To determine the bar graph 412, the server system 108 determines, for each of the time intervals, a likelihood that the person-of-interest 308 appears in the collection of video recordings for the time interval, and then represents that likelihood as the height of the bar 414 for that time interval. In this example embodiment, the server system 108 determines that likelihood as a maximum likelihood that the person-of-interest 308 appears in any one of the collection of video recordings for that time interval. In different embodiments, that likelihood may be determined differently. For example, in one different embodiment the server system 108 determines that likelihood as an average likelihood that the person-of-interest 308 appears in the image search results 406 that satisfy the match likelihood threshold.

In FIG. 4, the first and second indicators 410a,b that the application 144 displays on the image search results 406 are also displayed on the bar graph 412 on the bars 414 that correspond to the time intervals during which the first and second images 408a,b are captured by the cameras 169, and on the timeline 320 at positions corresponding to those time intervals. This permits the user of the application 144 to quickly identify not only the images 408a,b used as the bases for the thumbnails 402,404, but to be visually presented in three different ways information on when those images 408a,b were captured. This may be particularly useful when neither the first image 408a nor second image 408b is currently shown on the display 126 (e.g., they may include part of the image search results 406 but require that the user scroll in order to see them) and therefore the indicators 410a,b are visible only on one or both of the bar graph 412 and timeline 320.

While in the depicted embodiment the appearance likelihood plot is shown as comprising the bar graph 412, in different embodiments (not depicted) the plot may take different forms. For example, the plot in different embodiments may include a line graph, with different points on the line graph corresponding to appearance likelihood at different time intervals, or use different colors to indicate different appearance likelihoods.

As in FIG. 3, the page 300 of FIG. 4 also includes the timeline 320, video control buttons 322, and video time indicator 324 extending along the bottom of the page 300.

The application 144 permits the user to provide match confirmation user input regarding whether at least one of the image search results 406 depicts the person-of-interest 308. The user may provide the match confirmation user input by, for example, selecting one of the image search results 406 to bring up a context menu (not shown) allowing the user to confirm whether that search result 406 depicts the person-of-interest 308. In response to the match confirmation user input, the server system 108 in the depicted embodiment determines whether any match likelihoods change and, accordingly, whether positioning of the image search results 406 is to be changed in response to the match confirmation user input. For example, in one embodiment when the user confirms one of the results 406 is a match, the server system 108 may use that confirmed image as a reference for comparisons when performing one or both of face and body searches. When the positioning of the image search results is to be changed, the application 144 updates the positioning of the image search results 406 in response to the match confirmation user input. For example, the application 144 may delete from the image search results 406 any result the user indicates does not contain the person-of-interest 308 and rearrange the remaining results 406 accordingly. In one example embodiment, one or both of the face and body thumbnails 402,404 may change in response to the match confirmation user input. In another example embodiment, if the server system 108 is initially unable to identify any faces of the person-of-interest 308 and the application 144 accordingly does not display the face thumbnail 402, the server system 108 may be able to identify the person-of-interest's 308 face after receiving match confirmation user input and the application 144 may then show the face thumbnail 402.

Figure 5:
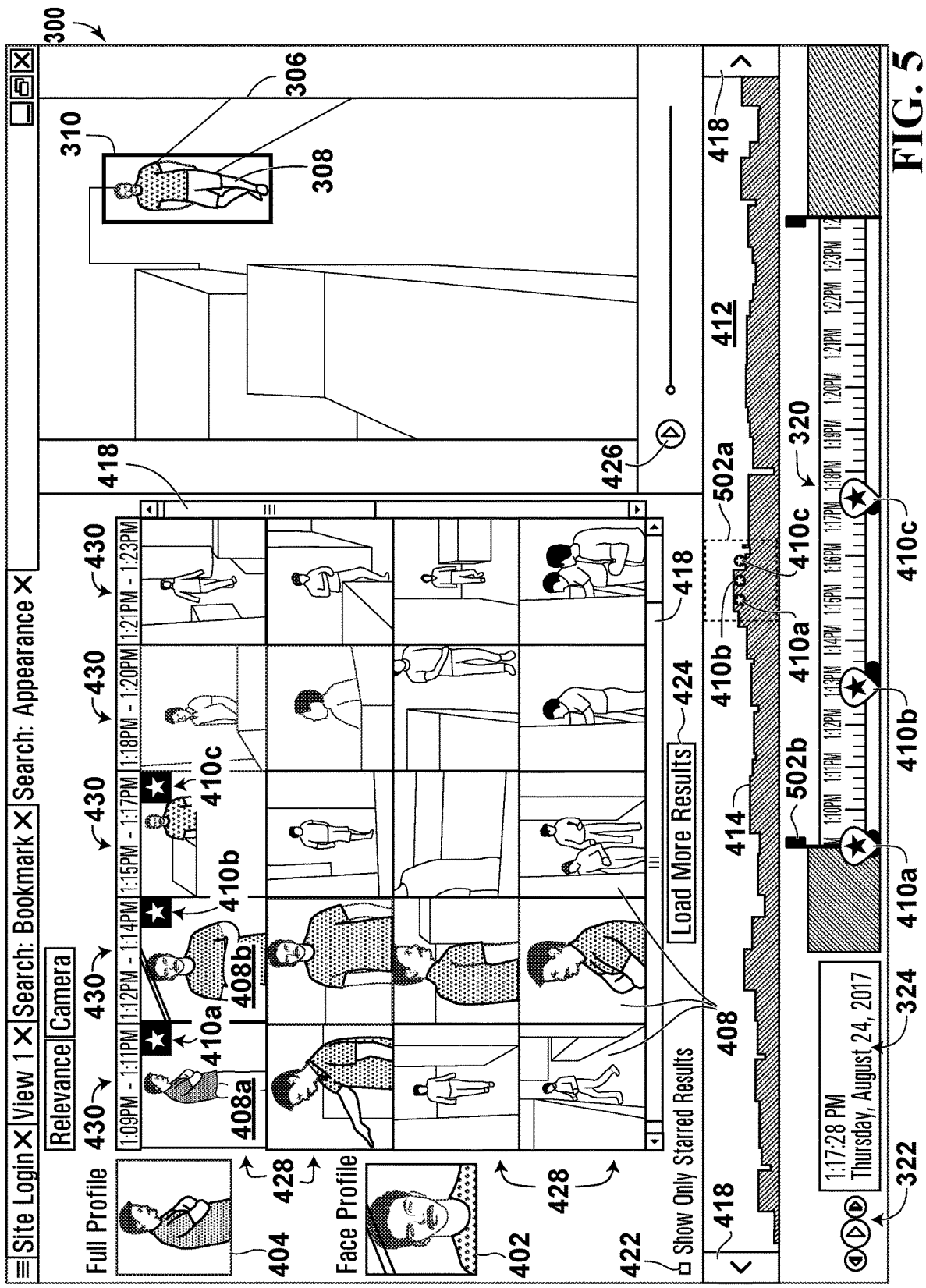
FIG. 5 shows a user interface page including image search results, a face thumbnail, and a body thumbnail of the person-of-interest, generated after a user has provided match confirmation user input, according to an example embodiment implemented using the client-side video review application of FIG. 2.

When the match confirmation user input indicates that any one of the selected image results 406 depicts the person-of-interest 308, the application 144 displays a third indicator 410c over each of the selected image results 406 that the user confirms corresponds to the person-of-interest 308. As shown in the user interface page 300 of FIG. 5, which represents the page 300 of FIG. 4 after the user has provided match confirmation user input, the third indicator 410c in the depicted embodiment is a star and is identical the first and second indicators 410a,b. All three indicators 410a-c in FIG. 5 are in the three leftmost columns and the first row of the array of search results 406. In different embodiments (not depicted), any one or more of the first through third indicators 410a-c may be different from each other.

The page 300 of FIG. 5 also shows an appearance likelihood plot resizable selection window 502a and a timeline resizable selection window 502b overlaid on the bar graph 412 and the timeline 320, respectively. The user, by using the input device 114, is able to change the width of and pan each of the windows 502a,b by providing window resizing user input. As discussed in further detail below in respect of FIGS. 8A and 8B, the selection windows 502a,b are synchronized such that resizing one of the windows 502a,b such that it covers a particular time span automatically causes the application 144 to resize the other of the windows 502a,b so that it also covers the same time span. Additionally, the application 144 selects the image search results 406 only from the collection of video recordings corresponding to the particular time span that the selection windows 502a,b cover. In this way, the user may reposition one of the selection windows 502a,b and automatically have the application 144 resize the other of the selection windows 502a,b and update the search results 406 accordingly.

Figure 8A:
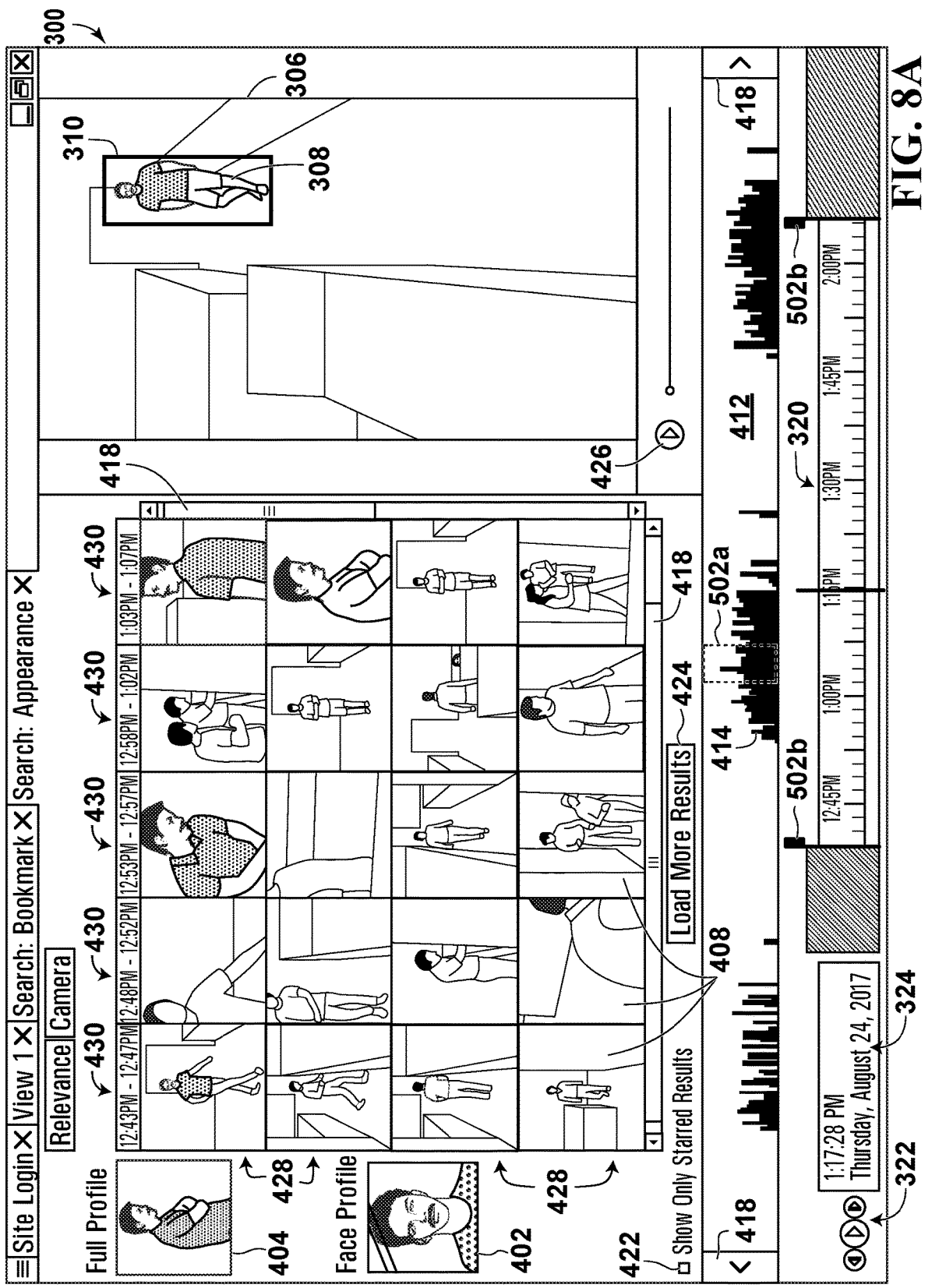
FIGS. 8A and 8B show a user interface page including image search results, a face thumbnail, and a body thumbnail of the person-of-interest in which a resizable window placed over a bar graph representing appearance likelihood is used to select image search results over a first duration (FIG. 8A) and a second, longer duration (FIG. 8B), according to an example embodiment implemented using the client-side video review application of FIG. 2.
Figure 8B:
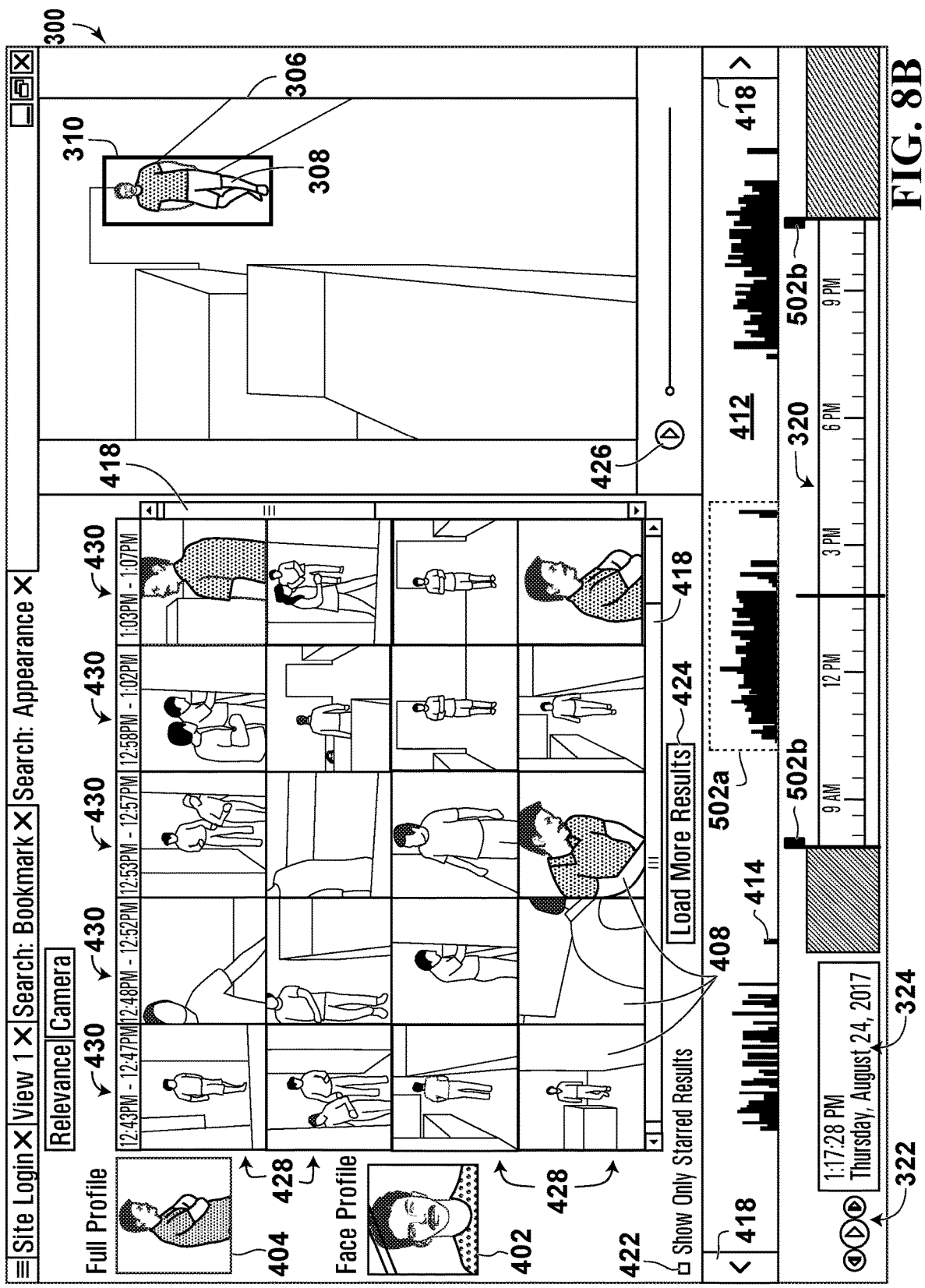

In FIGS. 8A and 8B, the user interface page 300 of FIG. 3 is shown with the resizable selection windows 502a,b selected to span a first duration (FIG. 8A, in which only a portion of the search results 406 for August 24th is selected) and a second, longer duration (FIG. 8B, in which substantially all of the search results 406 for August 24th is selected). As described above, the windows 502a,b in each of FIGS. 8A and 8B represent the same duration of time because the application 144, in response to the user resizing one of the windows 502a,b, automatically resizes the other. Additionally, the array of search results 406 the application 144 displays differs depending on the duration selected by the windows 502a,b, since the duration affects how much of the collection of video recordings may be used as a basis for the search results 406.

Figure 6:
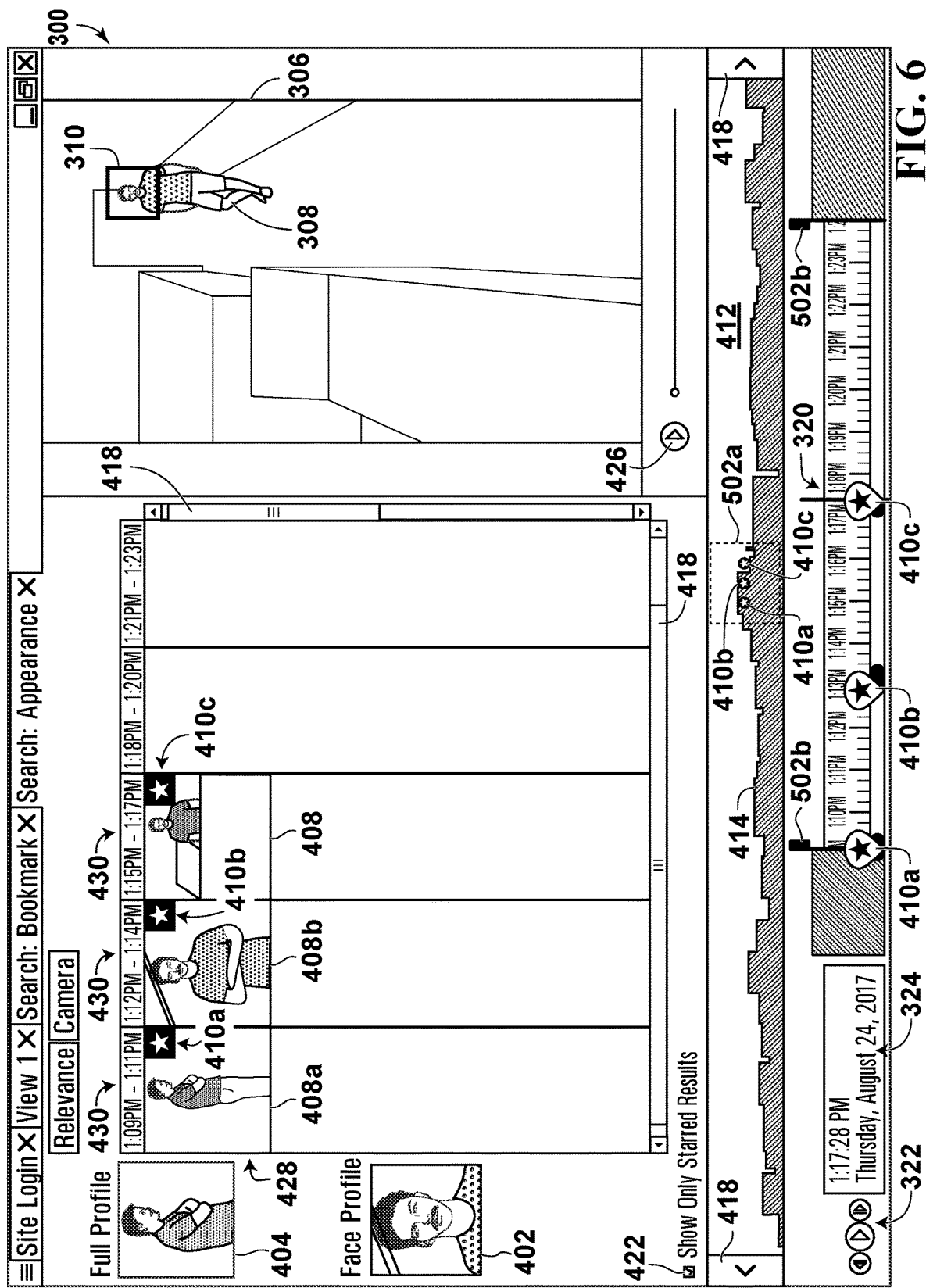
FIG. 6 shows a user interface page including image search results, a face thumbnail, and a body thumbnail of the person-of-interest, with the image search results limited to those a user has indicated show the person-of-interest, according to an example embodiment implemented using the client-side video review application of FIG. 2.

Referring now to FIG. 6, there is shown the user interface page 300 of FIG. 5 after the user has toggled the filter toggle 422 to limit the displayed search results 406 to those that the user has either provided match confirmation user input confirming that those results 406 display the person-of-interest 308 and to those that are used as the bases for the face and body thumbnails 402,404. As mentioned above, the indicators 410a-c used to highlight the search results 406 in the array is also used to highlight in the bar graph 412 and the timeline 320 when those results 406 were obtained.

Figure 7:
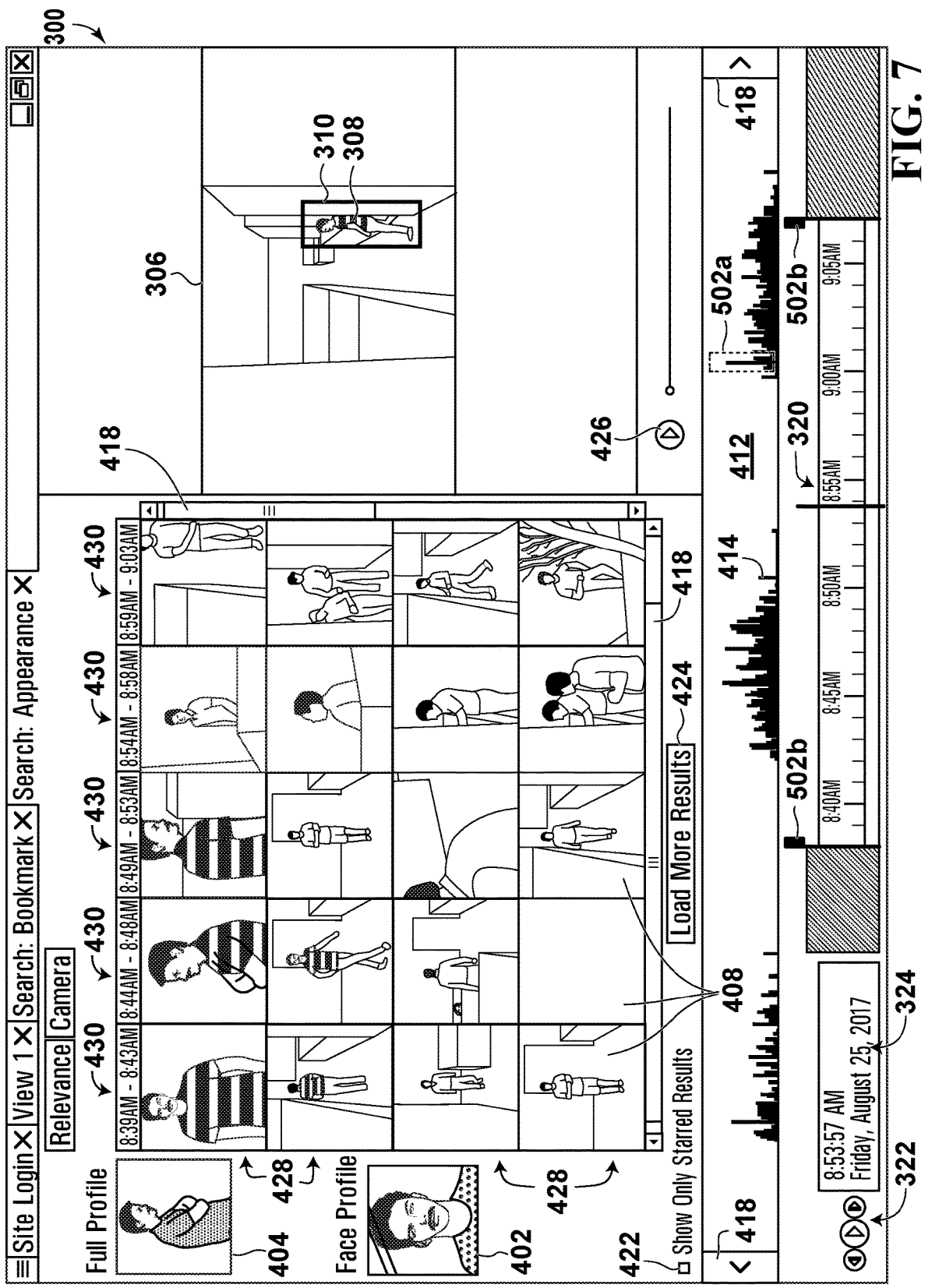
FIG. 7 shows a user interface page including image search results, a face thumbnail, and a body thumbnail of the person-of-interest, with the image search results showing the person-of-interest wearing different clothes than in FIGS. 3-6, according to an example embodiment implemented using the client-side video review application of FIG. 2.

FIG. 7 shows a user interface page including the image search results 406, the face thumbnail 402, and the body thumbnail 404 of the person-of-interest 308, with the image search results 406 showing the person-of-interest 308 wearing different clothes than in FIGS. 3-6. In FIG. 7, the selection windows 502a,b have been adjusted so that the image search results are limited to images from August 25th, while the search results 406 depicted in FIGS. 3-6 are limited to images from August 24th. As mentioned above, the server system 108 in the depicted embodiment searches the collection of video recordings for the person-of-interest 308 using both face and body searches, with the body search taking into account the person-of-interest's 308 clothing. Incorporating the face search accordingly helps the server system 108 identify the person-of-interest 308, particularly when his or her clothing is different at different times within one or more of the collection of video recordings or is different across different recordings comprising the collection of video recordings. Because the person-of-interest 308 in the results of FIG. 7 is wearing different clothing than in FIGS. 3-6 and the appearance of his body has accordingly changed, the person-of-interest 308 shown in the image search results 406 of FIG. 7 (such as in the results 406 labeled using reference numeral 702) is accordingly identified primarily using the face search as opposed to the body search.

Figure 9:
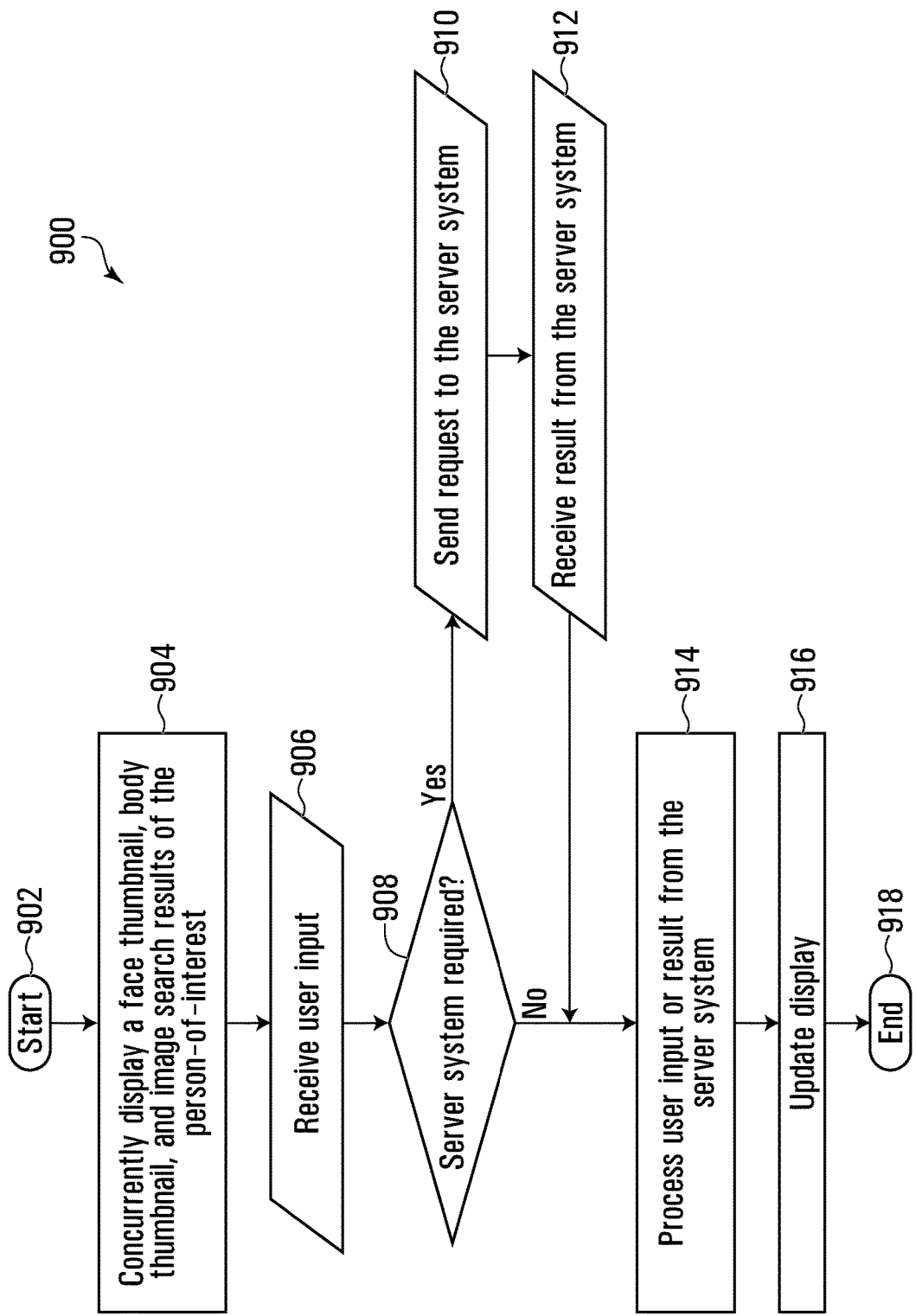
FIG. 9 shows a method for interfacing with a user to facilitate an image search for a person-of-interest, according to another example embodiment.

Referring now to FIG. 9, there is shown a method 900 for interfacing with the user to facilitate an image search for the person-of-interest 308, according to another example embodiment. The method 900 may be expressed as computer program code that implements the application 144 and that is stored in the terminal's 104 non-volatile storage 120. At runtime, the processor 112 loads the computer program code into the RAM 116 and executes the code, thereby performing the method 900.

The method 900 starts at block 902, following which the processor 112 proceeds to block 904 and concurrently displays, on the display 126, the face thumbnail 402, body thumbnail 404, and the image search results 406 of the person-of-interest 308.

The processor 112 proceeds to block 906 where it receives some form of user input; example forms of user input are the match confirmation user input and search commencement user input described above. Additionally or alternatively, the user input may comprise another type of user input, such as any one or more of interaction with the play/pause controls 426, the bar graph 412, and the timeline 320.

Following receiving the user input, the processor proceeds to block 908 where it determines whether the server system 108 is required to process the user input received at block 906. For example, if the user input is scrolling through the image results 406 using the scroll bars 418, then the server system 108 is not required and the processor 112 proceeds directly to block 914 where it processes the user input itself. When processing input in the form of scrolling, the processor 112 determines how to update the array of image results 406 in response to the scrolling and then proceeds to block 916 where it actually updates the display 126 accordingly.

In certain examples, the processor 112 determines that the server system 108 is required to properly process the user input. For example, the user input may include search commencement user input, which results in the server system 108 commencing a new search of the collection of video recordings for the person-of-interest 308. In that example, the processor 112 proceeds to block 910 where it sends a request to the server system 108 to process the search commencement user input in the form, for example, of a remote procedure call. At block 912 the processor 112 receives the result from the server system 108, which may include an updated array of image search results 406 and associated images.

The processor 112 subsequently proceeds to block 914 where it determines how to update the display 126 in view of the updated search results 406 and images received from the server system 108 at block 912, and subsequently proceeds to block 916 to actually update the display 126.

Regardless of whether the processor 112 relies on the server system 108 to perform any operations at blocks 910 and 912, a reference herein to the processor 112 or application 144 performing an operation includes an operation that the processor 112 or application 144 performs with assistance from the server system 108, and an operation that the processor 112 or application 144 performs without assistance from the server system 108.

After completing block 916, regardless of whether the processor 112 communicated with the server system 108 in response to the user input, the processor 112 proceeds to block 918 where the method 900 ends.

Certain adaptations and modifications of the described embodiments can be made. For example, with respect to either the client-side video review application 144 (FIGS. 1 and 2), these have been herein described as packaged software installed on the client terminal 104; however in some alternative example embodiments implementation of the UI can be achieved with less installed software through the use of a web browser application (e.g. one of the other applications 152 shown in FIG. 1). A web browser application is a program used to view, download, upload, surf, and/or otherwise access documents (for example, web pages). In some examples, the browser application may be the well-known Microsoft® Internet Explorer®. Of course other types of browser applications are also equally possible including, for example, Google® Chrome™. The browser application reads pages that are marked up (for example, in HTML). Also, the browser application interprets the marked up pages into what the user sees rendered as a web page. The browser application could be run on the computer terminal 104 to cooperate with software components on the server system 108 in order to enable a computer terminal user to carry out actions related to providing input in order to facilitate identifying same individuals or objects appearing in a plurality of different video recordings. In such circumstances, the user of the computer terminal 104 is provided with an alternative example user interface through which the user inputs and receives information in relation to the video recordings.

Although example embodiments have described a reference image for a search as being taken from an image within recorded video, in some example embodiments it may be possible to conduct a search based on a scanned photograph or still image taken by a digital camera. This may be particularly true where the photo or other image is, for example, taken recent enough such that the clothing and appearance is likely to be the same as what may be found in the video recordings.

Therefore, the above discussed embodiments are considered to be illustrative and not restrictive, and the invention should be construed as limited only by the appended claims.

The invention claimed is:

1. A method for interfacing with a user to facilitate an image search for a person-of-interest, the method comprising:
    concurrently displaying, on a display, a face thumbnail of the person-of-interest, a body thumbnail of the person-of-interest, and image search results of the person-of-interest;
    displaying a selected video recording concurrently with the face thumbnail, body thumbnail, and image search results, wherein the person-of-interest is displayed in the selected video recording;
    displaying a boundary box over the person-of-interest in the selected video recording;
    receiving search commencement user input indicating that a search for the person-of-interest is to commence;
    in response to the search commencement user input:
        using as the body thumbnail at least a portion of an image frame from the selected video recording contained within the boundary box;

searching a collection of video recordings for the person-of-interest, wherein the collection of video recordings comprises the selected video recording; and using as part of the face thumbnail a face of the person-of-interest identified during the searching of the collection of video recordings;

determining an appearance likelihood plot for the person-of-interest, wherein the appearance likelihood plot depicts a likelihood that the person-of-interest appears in the collection of video recordings over a time span; and displaying, concurrently with the image search results, the appearance likelihood plot.

2. The method of claim 1, wherein the time span is divided into time intervals, and wherein:

determining the appearance likelihood plot comprises determining, for each of the time intervals, a likelihood that the person-of-interest appears in the collection of video recordings for the time interval; and displaying the appearance likelihood plot comprises, for each of the time intervals, displaying a likelihood indicator representing the likelihood that the person-of-interest appears in the collection of video recordings for the time interval.

3. The method of claim 2, wherein, for each of the time intervals, the likelihood that the person-of-interest appears in the collection of video recordings for the time interval is determined as a maximum likelihood that the person-of-interest appears in any one of the collection of video recordings for the time interval.

4. The method of claim 3, wherein the appearance likelihood plot comprises a bar graph comprising a single bar for each of the time intervals.

5. The method of claim 1, further comprising displaying an appearance likelihood plot resizable selection window over the appearance likelihood plot, wherein the resizable selection window overlays at least a portion of the time span and the image search results are selected only from the collection of video recordings corresponding to the portion of the time span.

6. The method of claim 5, further comprising:

concurrently displaying a timeline with the appearance likelihood plot, wherein the timeline covers a time span comprising at least part of a duration of the collection of video recordings;

displaying a timeline resizable selection window over the timeline;

receiving window resizing user input indicating that the user is resizing one of the selection windows; and in response to the window resizing user input, adjusting the other of the selection windows such that both of the selection windows cover identical time spans.

7. The method of claim 1, wherein the image search results comprise a first image and a second image, the body thumbnail comprises at least a portion of the first image, the face thumbnail comprises at least a portion of the second image, and further comprising:

displaying a first and a second indicator over the first and second images indicating that the first and second images are bases for the body and face thumbnails, respectively; and displaying the first and second indicators on the appearance likelihood plot at positions corresponding to times the first and second images appear in the collection of video recordings.

8. The method of claim 7, further comprising concurrently displaying with the appearance likelihood plot:

a timeline, wherein the timeline covers a time span comprising at least part of a duration of the collection of video recordings; and the first and second indicators on the timeline at positions corresponding to times the first and second images appear in the collection of video recordings.

9. A method for interfacing with a user to facilitate an image search for a person-of-interest, the method comprising:

concurrently displaying, on a display, a face thumbnail of the person-of-interest, a body thumbnail of the person-of-interest, and image search results of the person-of-interest, wherein each of the image search results is positioned on the display according to a likelihood that the image search result comprises the person-of-interest;

receiving match confirmation user input regarding whether at least one of the image search results depicts the person-of-interest;

determining, using the match confirmation user input, whether positioning of the image search results is to be changed in response to the match confirmation user input; and when the positioning of the image search results is to be changed, updating the positioning of the image search results in response to the match confirmation user input.

10. The method of claim 1, further comprising displaying a selected video recording concurrently with the face thumbnail, body thumbnail, and image search results.

11. The method of claim 10, wherein the person-of-interest is displayed in the selected video recording, and further comprising:

displaying a boundary box over the person-of-interest in the selected video recording;

receiving search commencement user input indicating that a search for the person-of-interest is to commence; and in response to the search commencement user input, using as the body thumbnail at least a portion of an image frame from the selected video recording contained within the boundary box.

12. The method of claim 11, further comprising, in response to the search commencement user input:

searching a collection of video recordings for the person-of-interest, wherein the collection of video recordings comprises the selected video recording; and using as part of the face thumbnail a face of the person-of-interest identified during the searching of the collection of video recordings.

13. The method of claim 12, wherein the collection of video recordings comprises video recordings generated concurrently using different video cameras.

14. The method of claim 12, wherein the image search results comprise a first image and a second image, the body thumbnail comprises at least a portion of the first image, the face thumbnail comprises at least a portion of the second image, and the first and second images are different.

15. The method of claim 12, wherein searching the collection of video recordings for the person-of-interest comprises:

performing a face search on the collection of video recordings to identify the person-of-interest; and performing a body search on the collection of video recordings to identify the person-of-interest, wherein the image search results comprise results from the face search and results from the body search.

16. The method of claim 1, wherein the image search results comprise a first image and a second image, the body thumbnail comprises at least a portion of the first image, the face thumbnail comprises at least a portion of the second image, and further comprising displaying a first and a second indicator over the first and second images indicating that the first and second images are bases for the body and face thumbnails, respectively.

17. The method of claim 16, further comprising:
when the match confirmation user input indicates that any one of the selected image results depicts the person-of-interest, displaying a third indicator over the any one of the selected image results.

18. A system for interfacing with a user to facilitate an image search for a person-of-interest, the system comprising:
a display;
an input device;
a processor communicatively coupled to the display and the input device; and
a memory communicatively coupled to the processor and having stored thereon computer program code that is executable by the processor, wherein the computer program code, when executed by the processor, causes the processor to perform a method comprising:
concurrently displaying, on the display, a face thumbnail of the person-of-interest, a body thumbnail of the person-of-interest, and image search results of the person-of-interest, wherein each of the image search results is positioned on the display according to a likelihood that the image search result comprises the person-of-interest;
receiving, via the input device, match confirmation user input regarding whether at least one of the image search results depicts the person-of-interest;
determining, using the match confirmation user input, whether positioning of the image search results is to be changed in response to the match confirmation user input; and
when the positioning of the image search results is to be changed, updating the positioning of the image search results in response to the match confirmation user input.

19. The system of claim 18, wherein the method further comprises displaying, on the display, a selected video recording concurrently with the face thumbnail, body thumbnail, and image search results.

20. The system of claim 19, wherein the person-of-interest is displayed in the selected video recording, and wherein the method further comprises:
displaying a boundary box over the person-of-interest in the selected video recording;
receiving, via the input device, search commencement user input indicating that a search for the person-of-interest is to commence;
in response to the search commencement user input, using as the body thumbnail at least a portion of an image frame from the selected video recording contained within the boundary box.

21. The system of claim 20, wherein the method further comprises, in response to the search commencement user input:
searching a collection of video recordings for the person-of-interest, wherein the collection of video recordings comprises the selected video recording; and
using as part of the face thumbnail a face of the person-of-interest identified during the searching of the collection of video recordings.

22. The system of claim 18, wherein the image search results comprise a first image and a second image, the body thumbnail comprises at least a portion of the first image, the face thumbnail comprises at least a portion of the second image, and wherein the method further comprises displaying a first and a second indicator over the first and second images indicating that the first and second images are bases for the body and face thumbnails, respectively.

23. The system of claim 22, wherein the method further comprises:
when the match confirmation user input indicates that any one of the selected image results depicts the person-of-interest, displaying a third indicator over the any one of the selected image results.

24. A system for interfacing with a user to facilitate an image search for a person-of-interest, the system comprising:
a display;
an input device;
a processor communicatively coupled to the display and the input device; and
a memory communicatively coupled to the processor and having stored thereon computer program code that is executable by the processor, wherein the computer program code, when executed by the processor, causes the processor to perform a method comprising:
concurrently displaying, on the display, a face thumbnail of the person-of-interest, a body thumbnail of the person-of-interest, and image search results of the person-of-interest;
displaying, on the display, a selected video recording concurrently with the face thumbnail, body thumbnail, and image search results, wherein the person-of-interest is displayed in the selected video recording;
displaying a boundary box over the person-of-interest in the selected video recording;
receiving, via the input device, search commencement user input indicating that a search for the person-of-interest is to commence;
in response to the search commencement user input:
using as the body thumbnail at least a portion of an image frame from the selected video recording contained within the boundary box;
searching a collection of video recordings for the person-of-interest, wherein the collection of video recordings comprises the selected video recording; and
using as part of the face thumbnail a face of the person-of-interest identified during the searching of the collection of video recordings,
wherein the collection of video recordings comprises video recordings generated concurrently using different video cameras.

25. A system for interfacing with a user to facilitate an image search for a person-of-interest, the system comprising:
a display;
an input device;
a processor communicatively coupled to the display and the input device; and
a memory communicatively coupled to the processor and having stored thereon computer program code that is executable by the processor, wherein the computer program code, when executed by the processor, causes the processor to perform a method comprising:
concurrently displaying, on the display, a face thumbnail of the person-of-interest, a body thumbnail of the person-of-interest, and image search results of the person-of-interest;
displaying, on the display, a selected video recording concurrently with the face thumbnail, body thumbnail, and image search results, wherein the person-of-interest is displayed in the selected video recording;
displaying a boundary box over the person-of-interest in the selected video recording;
receiving, via the input device, search commencement user input indicating that a search for the person-of-interest is to commence;
in response to the search commencement user input:
using as the body thumbnail at least a portion of an image frame from the selected video recording contained within the boundary box;
searching a collection of video recordings for the person-of-interest, wherein the collection of video recordings comprises the selected video recording; and
using as part of the face thumbnail a face of the person-of-interest identified during the searching of the collection of video recordings,
wherein the image search results comprise a first image and a second image, the body thumbnail comprises at least a portion of the first image, the face thumbnail comprises at least a portion of the second image, and the first and second images are different.

26. A system for interfacing with a user to facilitate an image search for a person-of-interest, the system comprising:
a display;
an input device;
a processor communicatively coupled to the display and the input device; and
a memory communicatively coupled to the processor and having stored thereon computer program code that is executable by the processor, wherein the computer program code, when executed by the processor, causes the processor to perform a method comprising:
concurrently displaying, on the display, a face thumbnail of the person-of-interest, a body thumbnail of the person-of-interest, and image search results of the person-of-interest;
displaying, on the display, a selected video recording concurrently with the face thumbnail, body thumbnail, and image search results, wherein the person-of-interest is displayed in the selected video recording;
displaying a boundary box over the person-of-interest in the selected video recording;
receiving, via the input device, search commencement user input indicating that a search for the person-of-interest is to commence;
in response to the search commencement user input:
using as the body thumbnail at least a portion of an image frame from the selected video recording contained within the boundary box;
searching a collection of video recordings for the person-of-interest, wherein the collection of video recordings comprises the selected video recording; and
using as part of the face thumbnail a face of the person-of-interest identified during the searching of the collection of video recordings,
wherein searching the collection of video recordings for the person-of-interest comprises:
performing a face search on the collection of video recordings to identify the person-of-interest; and
performing a body search on the collection of video recordings to identify the person-of-interest, and
wherein the image search results comprise results from the face search and results from the body search.

27. A system for interfacing with a user to facilitate an image search for a person-of-interest, the system comprising:
a display;
an input device;
a processor communicatively coupled to the display and the input device; and
a memory communicatively coupled to the processor and having stored thereon computer program code that is executable by the processor, wherein the computer program code, when executed by the processor, causes the processor to perform a method comprising:
concurrently displaying, on the display, a face thumbnail of the person-of-interest, a body thumbnail of the person-of-interest, and image search results of the person-of-interest;
displaying, on the display, a selected video recording concurrently with the face thumbnail, body thumbnail, and image search results, wherein the person-of-interest is displayed in the selected video recording;
displaying a boundary box over the person-of-interest in the selected video recording;
receiving, via the input device, search commencement user input indicating that a search for the person-of-interest is to commence;
in response to the search commencement user input:
using as the body thumbnail at least a portion of an image frame from the selected video recording contained within the boundary box:
searching a collection of video recordings for the person-of-interest, wherein the collection of video recordings comprises the selected video recording; and
using as part of the face thumbnail a face of the person-of-interest identified during the searching of the collection of video recordings,
determining an appearance likelihood plot for the person-of-interest, wherein the appearance likelihood plot depicts a likelihood that the person-of-interest appears in the collection of video recordings over a time span; and
displaying, on the display and concurrently with the image search results, the appearance likelihood plot.

28. The system of claim 27, wherein the time span is divided into time intervals, and wherein:
determining the appearance likelihood plot comprises determining, for each of the time intervals, a likelihood that the person-of-interest appears in the collection of video recordings for the time interval; and
displaying the appearance likelihood plot comprises, for each of the time intervals, displaying a likelihood indicator representing the likelihood that the person-of-interest appears in the collection of video recordings for the time interval.

29. The system of claim 28, wherein, for each of the time intervals, the likelihood that the person-of-interest appears in the collection of video recordings for the time interval is determined as a maximum likelihood that the person-of-interest appears in any one of the collection of video recordings for the time interval.

30. The system of claim 29, wherein the appearance likelihood plot comprises a bar graph comprising a single bar for each of the time intervals.

31. The system of claim 27, wherein the method further comprises displaying an appearance likelihood plot resizable selection window over the appearance likelihood plot, wherein the resizable selection window overlays at least a portion of the time span and the image search results are selected only from the collection of video recordings corresponding to the portion of the time span.

32. The system of claim 31, wherein the method further comprises:
    concurrently displaying, on the display, a timeline with the appearance likelihood plot, wherein the timeline covers a time span comprising at least part of a duration of the collection of video recordings;
    displaying a timeline resizable selection window over the timeline;
    receiving window resizing user input, via the input device, indicating that the user is resizing one of the selection windows; and
    in response to the window resizing user input, adjusting the other of the selection windows such that both of the selection windows cover identical time spans.

33. The system of claim 27, wherein the image search results comprise a first image and a second image, the body thumbnail comprises at least a portion of the first image, the face thumbnail comprises at least a portion of the second image, and wherein the method further comprises:
    displaying a first and a second indicator over the first and second images indicating that the first and second images are bases for the body and face thumbnails, respectively; and
    displaying the first and second indicators on the appearance likelihood plot at positions corresponding to times the first and second images appear in the collection of video recordings.

34. The system of claim 33, wherein the method further comprises concurrently displaying on the display and with the appearance likelihood plot:
    a timeline, wherein the timeline covers a time span comprising at least part of a duration of the collection of video recordings; and
    the first and second indicators on the timeline at positions corresponding to times the first and second images appear in the collection of video recordings.

35. A method for interfacing with a user to facilitate an image search of a collection of video recordings for a person-of-interest, the method comprising:
    concurrently displaying on a display:
        image search results for the person-of-interest, wherein the image search results are displayed as an array of n columns by m rows, each of the columns corresponds to a different time interval, and for each of the columns the search results for any one of the rows has a likelihood of displaying the person-of-interest no lower than any lower one of the rows;
        a face thumbnail of the person-of-interest; and
        a body thumbnail of the person-of-interest;
    receiving match confirmation user input regarding whether at least one of the image search results depicts the person-of-interest;
    determining, using the match confirmation user input, whether positioning of the image search results is to be changed in response to the match confirmation user input indicating that any one or more of the image search results comprises the person-of-interest; and
    when the positioning of the image search results is to be changed, updating the positioning of the image search results by adjusting the rows in which the image search results are displayed.

* * * * *